United States Patent
Bocca et al.

(10) Patent No.: US 10,124,768 B1
(45) Date of Patent: Nov. 13, 2018

(54) BLUETOOTH LOW ENERGY (BLE) PASSIVE VEHICLE ACCESS CONTROL SYSTEM FOR DEFENDING THE SYSTEM AGAINST RELAY ATTACKS AND METHOD THEREOF

(71) Applicant: Robert Bosch GmbH, Stuttgart (DE)

(72) Inventors: Maurizio Bocca, Sunnyvale, CA (US);
Vivek Jain, Sunnyvale, CA (US);
Christoph Lang, Sunnyvale, CA (US);
Huang Lee, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/590,269

(22) Filed: May 9, 2017

(51) Int. Cl.
*G05B 19/00* (2006.01)
*B60R 25/24* (2013.01)

(52) U.S. Cl.
CPC ........ *B60R 25/24* (2013.01); *B60R 2325/101* (2013.01); *B60R 2325/108* (2013.01)

(58) Field of Classification Search
CPC .............. B60R 25/24; B60R 2325/101; B60R 2325/108
See application file for complete search history.

(56) References Cited

U.S. PATENT DOCUMENTS

| | | | |
|---|---|---|---|
| 5,557,254 A * | 9/1996 | Johnson | B60R 25/102 340/426.19 |
| 7,301,467 B2 * | 11/2007 | Ishimura | B60R 25/24 340/435 |
| 8,847,731 B2 * | 9/2014 | Tieman | B60R 25/24 340/425.5 |
| 9,194,710 B1 * | 11/2015 | Iyer | G01C 21/26 |
| 9,763,041 B2 * | 9/2017 | Louboutin | H04W 4/021 |
| 9,855,918 B1 * | 1/2018 | Melaragni | B60R 25/01 |
| 2002/0033752 A1 * | 3/2002 | Greenwood | B60R 25/246 340/5.61 |
| 2005/0038574 A1 * | 2/2005 | Gila | G01S 13/84 701/2 |

(Continued)

*Primary Examiner* — Joseph Feild
*Assistant Examiner* — Rufus Point
(74) *Attorney, Agent, or Firm* — Maginot Moore & Beck LLP

(57) ABSTRACT

A Bluetooth Low-Energy (BLE) passive vehicle access control system integrated into a vehicle and an external device to defend the system against relay attacks is provided. The system includes a location received configured to determine a current location of the system. The location of the system may be in the form of latitude and longitude, altitude, or combination thereof. The system further includes a vehicle and an external device. The location receiver may be integrated into the vehicle, the external device, or both. A processor is communicatively coupled the location receiver to any number of wireless transceivers. A comparator configured to compare the current location of both the vehicle and the external device may be optionally coupled to the location receiver and the processor. Any number of electromagnets for generating a magnetic field may be installed in the vehicle and located adjacent to the transceivers. A magnetometer of the external device measures the intensity of the magnetic field, encrypts the magnetic field with a secret magnetic key, and returns the encrypted magnetic field back to the vehicle.

12 Claims, 5 Drawing Sheets

(56) References Cited

U.S. PATENT DOCUMENTS

| | | | | |
|---|---|---|---|---|
| 2005/0283839 | A1* | 12/2005 | Cowburn | G06K 19/06187 726/26 |
| 2010/0191392 | A1* | 7/2010 | Juzswik | B60R 25/245 701/2 |
| 2012/0092129 | A1* | 4/2012 | Lickfelt | B60R 25/24 340/5.72 |
| 2013/0332007 | A1* | 12/2013 | Louboutin | H04W 4/021 701/1 |
| 2014/0062774 | A1* | 3/2014 | Hale | G01S 19/48 342/357.31 |
| 2014/0103865 | A1* | 4/2014 | Van Wiemeersch | H02J 17/00 320/108 |
| 2014/0308971 | A1* | 10/2014 | O'Brien | H04W 4/046 455/456.1 |
| 2015/0105944 | A1* | 4/2015 | Louboutin | H04W 4/021 701/2 |
| 2015/0149042 | A1* | 5/2015 | Cooper | B60R 16/037 701/48 |
| 2015/0308396 | A1* | 10/2015 | Elzein | F02N 11/0807 455/420 |
| 2015/0365898 | A1* | 12/2015 | Matsushita | H04M 1/7253 455/574 |
| 2015/0382195 | A1* | 12/2015 | Grim | H04L 63/08 726/4 |
| 2016/0012653 | A1* | 1/2016 | Soroko | G07C 9/00007 340/5.61 |
| 2016/0125675 | A1* | 5/2016 | Ziller | B60R 25/24 340/5.72 |
| 2016/0297399 | A1* | 10/2016 | Suzuki | B60R 25/32 |
| 2017/0018128 | A1* | 1/2017 | Berezin | G07C 9/00111 |
| 2017/0144628 | A1* | 5/2017 | Liu | B60R 25/08 |
| 2017/0158169 | A1* | 6/2017 | Luo | B60R 25/245 |
| 2017/0193717 | A1* | 7/2017 | Kim | B60R 25/24 |
| 2017/0201860 | A1* | 7/2017 | Elnajjar | H04B 17/318 |
| 2017/0278330 | A1* | 9/2017 | Buttolo | G07C 9/00119 |
| 2017/0308817 | A1* | 10/2017 | Miller | G06Q 10/02 |
| 2017/0336516 | A1* | 11/2017 | Berkovich | G01S 19/47 |

\* cited by examiner

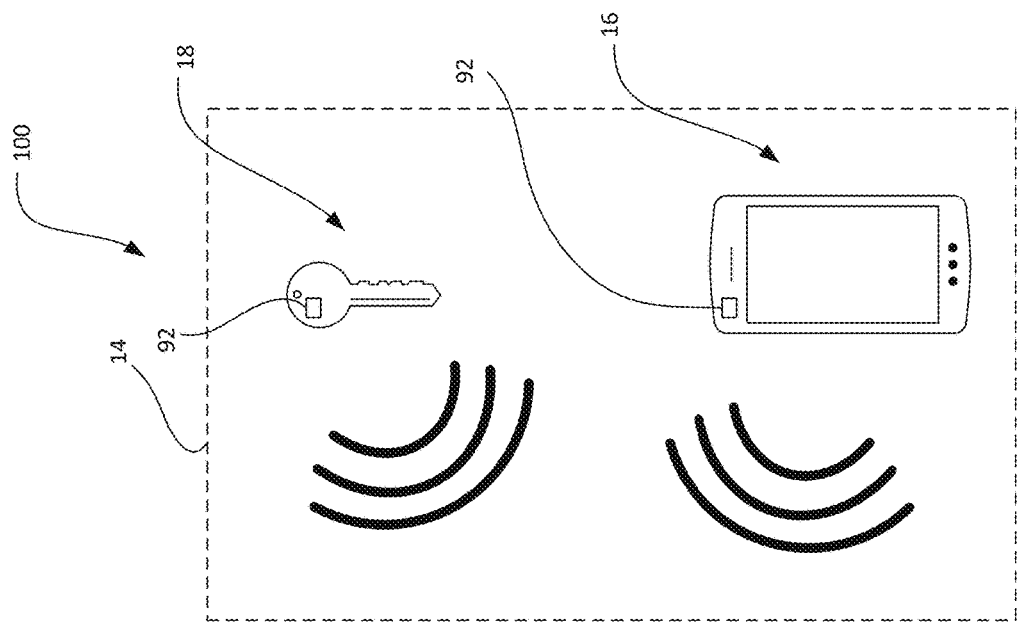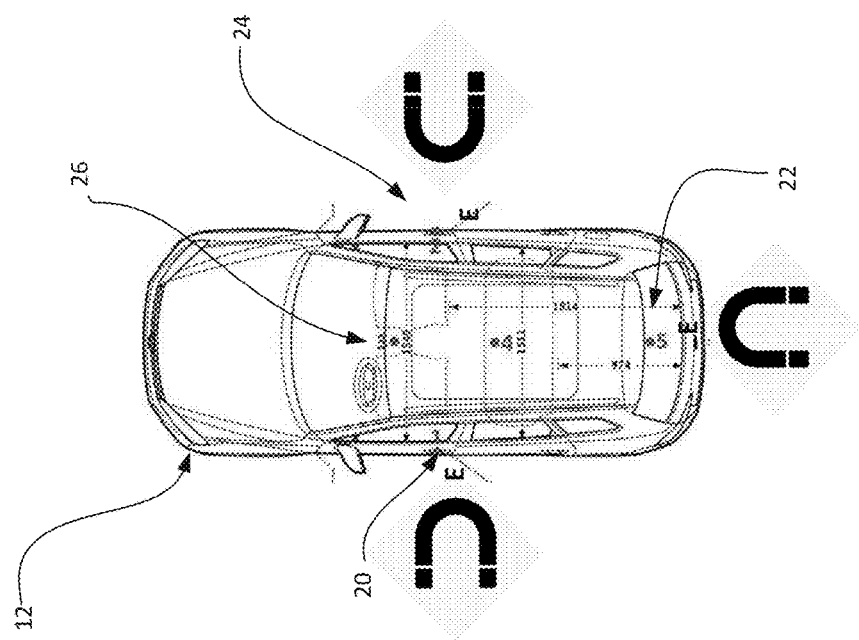
FIG. 5

BLUETOOTH LOW ENERGY (BLE) PASSIVE VEHICLE ACCESS CONTROL SYSTEM FOR DEFENDING THE SYSTEM AGAINST RELAY ATTACKS AND METHOD THEREOF

FIELD

This disclosure relates generally to anti-relay attack access control systems and, more particularly, to a BLE passive vehicle access control system for defending the system against relay attacks and method thereof.

BACKGROUND

Unless otherwise indicated herein, the materials described in this section are not prior art to the claims in this application and are not admitted to the prior art by inclusion in this section.

Standard Passive Entry Systems (PES) key fobs typically operate on two radio frequencies (RF). For example, low frequency (LF) communication is used for proximity detection and localization required for the Comfort Entry Go (CEG) functionality. Another frequency, such as ultra-high frequency (UHF), is used to extend the communication range for Remote Keyless Entry (RKE) functionality. Passive Entry Systems (PES) have strict proximity/localization requirements. For example, with a PES system providing RKE and CEG, a vehicle unlocks the doors only when a driver or a person authorized to access is within a perimeter at ~2 m from the vehicle. The PES/CEG system further allows the user or the driver to start the engine only when the key fob is inside the vehicle. These localization requirements are hard to satisfy for any wireless technology. Therefore, the current systems require LF, e.g. 125 kHz, antennas both inside and outside the vehicle along with optimal power control to satisfy the proximity/localization requirements. On the other hand, communication link from the key fob to the vehicle for RKE (i.e., when the user explicitly presses the lock/unlock button on the key fob) is based on UHF to satisfy both the range requirement (~50 m) and the antenna size requirement (i.e., the antenna needs to fit in a small key fob).

These systems are vulnerable to relay attacks. In a relay attack, an attacker uses a relay apparatus such as an analog amplifier to amplify the received signals from either the PES on the vehicle or the key fob and retransmit the received signals back to either the system or the key fob. This attack makes the key fob believes the driver is in proximity of the vehicle, so that the key fob sends an access control command in UHF to the vehicle, which in turn unlocks the vehicle. In more advanced attacks, one attacker may also employ an advanced relay apparatus capable of measuring the power of the received signals and replicating the signals by adjusting the transmit power accordingly.

Electronic and wearable devices with integrated keyless passive entry systems are becoming widely used due to several advantages. For example, the user does not require to rely on key fobs for the access of the vehicle and further the user does not require to actively interact with the device nor the key fob with integrated PES in order to access the vehicle. However, these devices with integrated PES are also vulnerable to relay attacks.

Therefore, there is a long felt need to provide an improved passive vehicle access control system to defend the system against relay attacks.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to a BLE passive vehicle access control system comprise a vehicle, an external device communicatively coupled to the vehicle, a location receiver assembly, the location receiver assembly is configured to determine a coordinate of at least one of the vehicle and the external device, and a processor communicatively coupled to the location receiver assembly, the processor disables a communication between the vehicle and the external device if the coordinate of vehicle and the external device does not match. The location receiver assembly comprises a first location receiver and a second location receiver, wherein the first location receiver determines the coordinate of the vehicle and the second location receiver determines the coordinate of the external device. The coordinate comprises at least one of latitude and longitude, and altitude of the vehicle and the external device. The BLE passive vehicle access control system further comprises a comparator configured to compare the coordinate of the vehicle and the external device. The location receiver assembly is a global positioning system (GPS). The BLE passive vehicle access control system further comprises a magnetometer configured to measure an intensity of magnetic field generated by the vehicle, encrypt the measured magnetic field with a secret magnetic key, and return the measured magnetic field with an encrypted secret magnetic key to the vehicle. The magnetometer is positioned in the external device.

According to another exemplary embodiment of the disclosure, an access control system comprises a sensor for measuring at least one of a coordinate or an intensity of a magnetic field of the vehicle and a processor in communication with the sensor is configured to disable a connection between an external device and the vehicle. The sensor is a location receiver, the location receiver is positioned in the vehicle communicatively coupled to an external device to measure the coordinate of the vehicle. The coordinate is at least one of latitude and longitude, and the altitude of the vehicle. The sensor is a magnetometer configured to measure the intensity of the magnetic field generated by the vehicle, the magnetometer is positioned in an external device communicatively coupled to the vehicle. The magnetometer is further configured to encrypt the measured intensity of the magnetic field with a secret magnetic key and return the measured intensity of the magnetic field with the secret magnetic key to the vehicle. According to another exemplary embodiment of the disclosure, a method comprises measuring at least one of a coordinate of one of a vehicle and an external device and disabling a connection between an external device and the vehicle, wherein the coordinate of the vehicle and the external device does not match in close proximity to each other. The method further comprises measuring an intensity of magnetic field generated by the vehicle, encrypting the measured intensity of the magnetic field with a secret magnetic key, and returning the measured intensity of the magnetic field with the secret magnetic key to the vehicle.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein:

FIG. 5 is a block diagram of a system according to another described embodiment of the disclosure.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
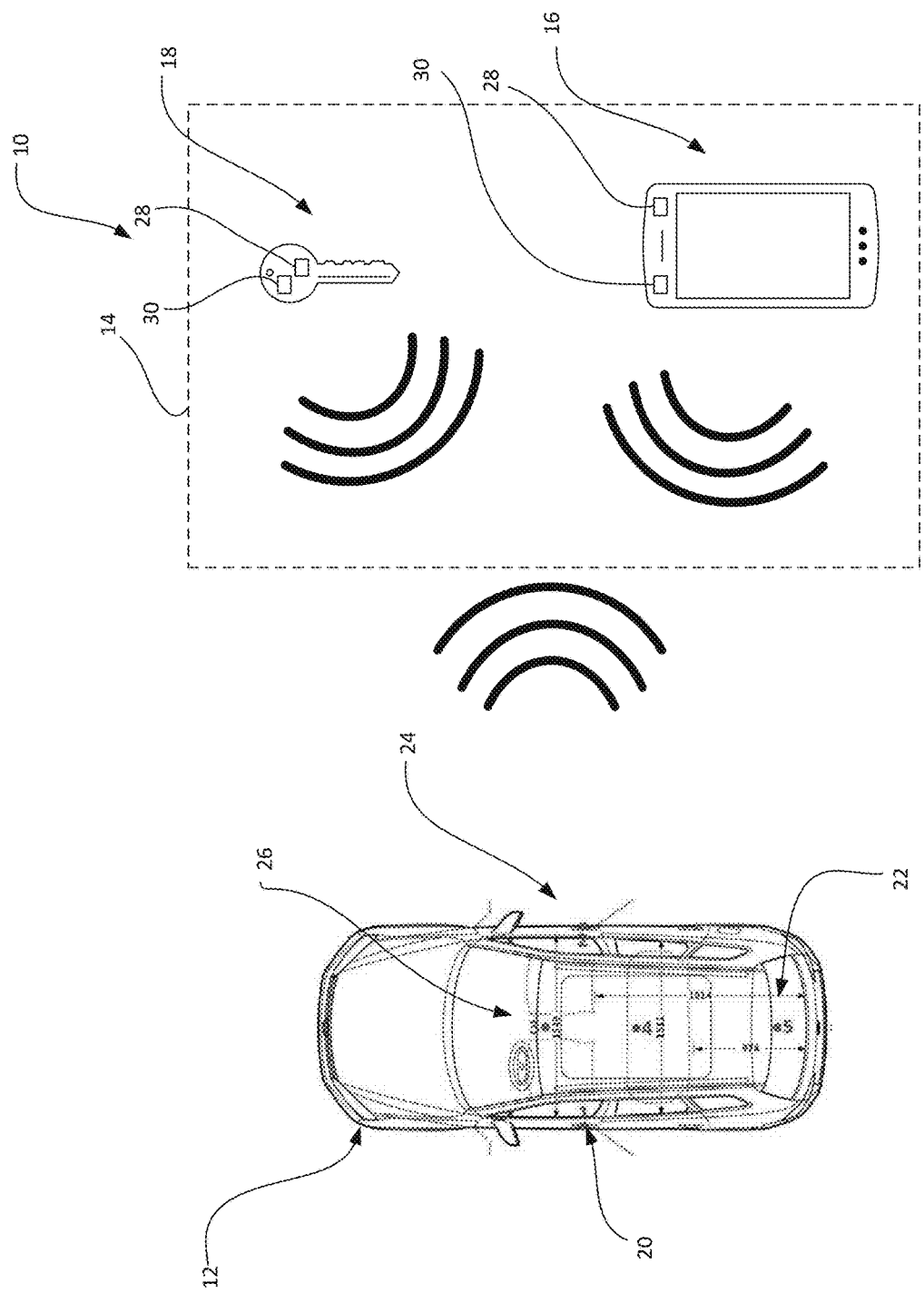
FIG. 1 is a block diagram of a system according to a described embodiment of the disclosure.

FIG. 1 illustrates a system 10 in accordance with a disclosure. The system 10 is a passive vehicle access control system comprises a vehicle 12 and an external device 14 communicatively coupled to the vehicle 12 via a communication link. As illustrated, the communication link is a Bluetooth (BT) communication protocol and standard including a Bluetooth Low Energy (BLE) communication protocol. The external device 14 may be any BLE-enabled device such as a key/card device or any other client device. The external device 14 also includes passive vehicle access control functionality generally known to the industry. The key/card device may be a key fob, key card, a client device, an access key, an access card, a smart card, a smart key, or any suitable BLE-enabled device. The client device may be a smart phone, a personal digital assistant (PDA), a tablet, a laptop, a portable personal computer, a phablet, a wearable device, a thin device, a thick device, an entertainment device, an infotainment device, or any suitable portable/wearable device including Bluetooth low energy protocol or any suitable BT communication protocol. As illustrated, the key/card device is a smart key 18 and the client device is a phablet 16, both with BLE passive vehicle access control. A plurality of wireless transceivers 20, 22, 24, 26 comprises integrated antenna are installed at various locations in and around the vehicle 12. In one embodiment, the antenna is a directional antenna. Depending on the application, other suitable antenna either integrated into or coupled to the transceivers. For example, wireless transceiver 20 and 24 are installed near the handle of the front doors. Wireless transceiver 22 is installed near the rear end of the vehicle, whereas wireless transceiver 26 is installed at the front end of the vehicle. For instance, the wireless transceiver 26 is located at a location near to a dashboard. As can be seen, except the wireless transceiver 26 that faces toward the inside of the vehicle, the rest of the wireless transceivers 20, 22, 24 are facing outwardly. Any number of transceivers 20, 22, 24, 26 periodically transmit signals such as advertisement beacons to announce the presence of the vehicle 12 to at least one of the smart key 18 or the phablet 16 carried by a driver or an authorized person of the vehicle 12. When one of the smart key 18 or the phablet 16 receives these advertisement beacons, one of the smart key 18 or the phablet 16 starts or initiates the connection and authentication process with the vehicle 12 via for example the transceivers 20, 22, 24, 26. During this process, the vehicle 12 and one of the smart key 18 or the phablet 16 continuously exchange data packets. At the completion of this process, one of the smart key 18 or the phablet 16 periodically transmits beacons while either any number of the transceivers 20, 22, 24, 26 or a BLE-enabled passive vehicle access control device coupled to the transceivers 20, 22, 24, 26 measures Received Signal Strength (RSS) of these beacons in order to estimate the position of one of the smart key 18 or the phablet 16. The BLE-enabled passive vehicle access control device is also located on the vehicle 12. In some embodiments, more than one BLE-enabled passive vehicle access control device may be installed in the vehicle 12 and then coupled to any in-vehicle devices via any number of communication links. In some embodiments, the BLE enabled passive vehicle access control device is remotely located outside the vehicle 12 and is communicatively coupled to the vehicle 12 via any suitable communication interface. In another embodiments, the BLE enabled passive vehicle access control device is located in a network. The network can be, for example, a local-area network (LAN), a metropolitan area network (MAN), a wide area network (WAN), a primary network comprising multiple sub-networks located between the vehicle 12 and the external devices 14, a cloud network, and so forth. The yet embodiment, the BLE enabled passive vehicle access control device is located on a server. The cloud network can be a public cloud network, a private cloud network, for example.

To increase the level of security in controlling the access to the vehicle and to defend the system 10 against relay attacks performed during the communication established between the vehicle 12 and the external device 14, a motion detector 28 disposed in the external device 14 is provided. The motion detector 28, in one embodiment, includes an accelerometer, and is configured to detect and distinguish among various types of motion and vibration. In some embodiments, the motion detector 28 includes a motion sensor, a gyroscope, a magnetometer, a vibration sensor, or any other suitable sensors. A desired program code in the form of a set of computer-executable instructions or data structures may be stored in the motion detector 28 and the instructions allow the motion detector 28 to detect and distinguish various types of motion and vibration. A processor coupled to the accelerometer 28 receives the measured information including acceleration data, compares the acceleration data with a set of pre-determined criteria as described in detail below, and distinguishes the acceleration data associated with a motion or vibration of the external device 14. Further, the processor analyzes the acceleration data to determine if a sequence of motion and vibration matches with a set of pre-determined criteria, i.e. an expected sequence of motion and vibration. A set of pre-determined criteria includes a significant or maximum motion, e.g. walking towards or away from the vehicle, a minimum motion, e.g. single step detection, a no motion, e.g. no change in location, a vibration mode, or so forth. If the sequence of motion and vibration does not match with the set of pre-determined criteria, a bi-directional communication between the vehicle 12 and the external device 14 is disabled, which in turn disrupts any relay attacks.

The motion detector 28 of the external device 14 or the processor located in the vehicle 12 may be configured to distinguish between a true motion event and a false motion event. For example, the processor located in the vehicle 12 receives the measured information including acceleration data from the motion detector 28, compares the acceleration data with a set of pre-determined criteria, and distinguishes the acceleration data between a true motion event and false motion event. If the event is determined to be a false motion event, i.e. the external device 14 is not moving, then the bi-directional communication between the vehicle 12 and the external device 14 is disabled to defend the vehicle 12 and the external device 14 against any relay attacks. The processor and the accelerometer may be integrated into the motion detector 28, in one example. In another example, the processor is located somewhere inside the external device 14 and is an independent component from the motion detector 28. In yet another example, the processor is located in the vehicle 12 and the motion detector 28 is communicatively coupled to the processor.

Figure 2:
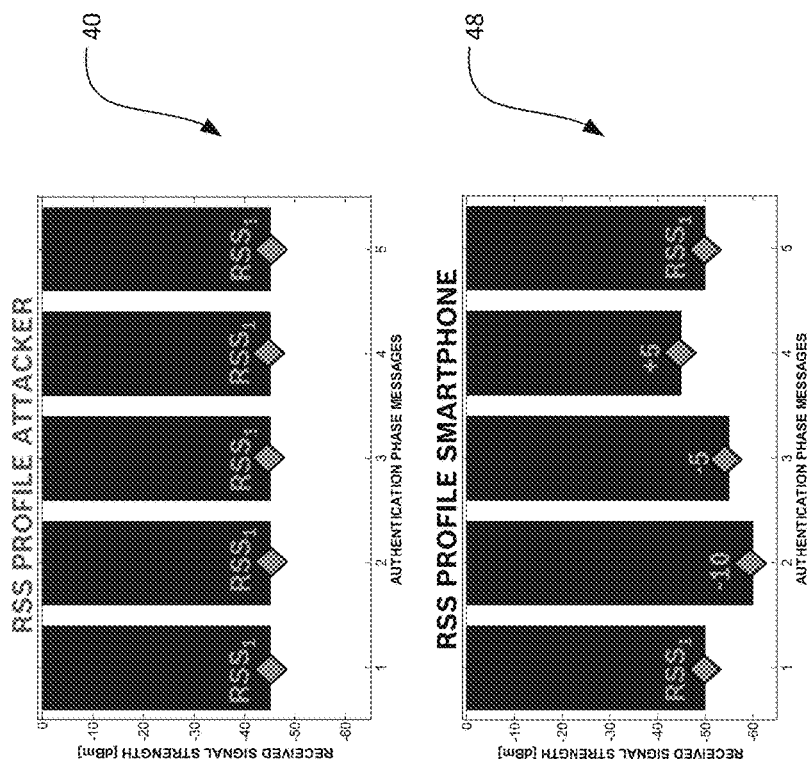
FIG. 2A is a graph showing RSS profile data in accordance with the disclosure.
FIG. 2B is another graph showing RSS profile data in accordance with the disclosure.

To provide another level of security in controlling the access to the vehicle and to defend the system 10 against relay attacks during the communication established between the vehicle 12 and the external device 14, a microprocessor 30 having a set of computer executable instructions including a TX power profiling is provided. During the connection and authentication phase, the external device 14 and the vehicle 12 transmit to each other several packets. For example, the transmitting device, such as the external device 14, modulates the transmit (TX) power level of successive transmissions according to a specific and secret pattern so to create at a receiving end of the communication link, such as the vehicle 12, an identical RX power (RSS) level profile that serves as an authentication before a connection between the external device 14 and the vehicle 12 is established. The receiving end of the communication link in the vehicle 12 measures the RX power (RSS) level of successive incoming signals, compares the RX power level of successive incoming signals with the pre-defined secure pattern stored in a machine readable medium. The machine readable medium may be located in either the vehicle 12, the external device 14, the network, or the server. If the RSS of the incoming signals is constant, a communication between the vehicle 12 and the external device 14 is disabled, which in turn disrupts any relay attacks. FIG. 2A shows the graph 40 of the constant RSS profile generated by an attacker. Now referring to FIG. 2B, a secret TX power profile generates a specific and secret RSS profile pattern illustrated as a graph 48. As can be seen, both vehicle 12 and external device 14 are able to detect the presence of a relay attack by measuring the power of the received signals and then comparing the resulting RSS profile with the pre-defined and secure TX power profile. In one embodiment, the same packet (message) is transmitted multiple times during the connection and authentication phase by varying transmit power level. In another embodiment, each packet (message) is transmitted during the connection and authentication phase by varying the transmit power level. In yet another embodiment, the transmit power level used to transmit the packet (message) may be added to the payload of the encrypted transmitted packet. The receiving end of the communication link in the vehicle 12 measures the RSS of the received packet and adds this value to the payload of the encrypted response packet. In turn, the transmitting device 14 further uses this information to adjust its own transmit power level to the same level.

Figure 3:
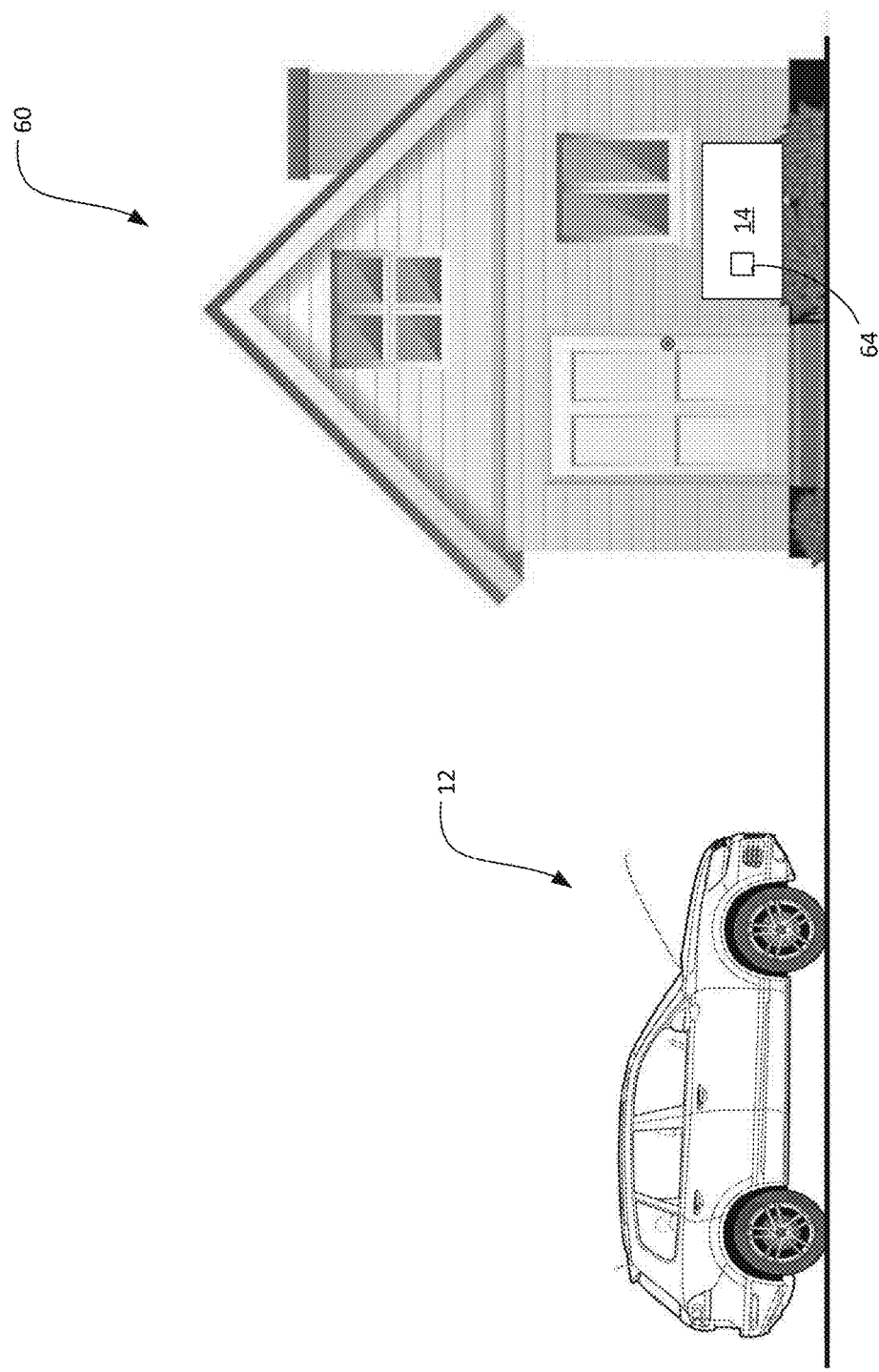
FIG. 3 is a block diagram of a system according to another described embodiment of the disclosure.

FIG. 3 illustrates another system 60 in accordance with a disclosure. The system 60 is identical to the system 10 illustrated in FIG. 1, except that the system 60 includes a barometric pressure sensor 64 configured to measure barometric pressure, which ultimately translates the measured barometric pressure into altitude value. If the altitude value of the vehicle 12 does not match with the altitude value of the external device 14, a bi-directional communication between the vehicle 12 and the external device 14 is disabled, which in turn disrupts any relay attacks. This altitude or barometric pressure reading process provides a level of security in controlling the access to the vehicle 12 and to defend the system 60 against relay attacks during the communication established between the vehicle 12 and the external device 14. In one embodiment, the barometric pressure sensor 64 is integrated into the motion detector 28. In another embodiment, the barometric pressure sensor 64 may be a separate component is communicatively coupled to the motion detector 28. A suitable program code in the form of a set of computer-executable instructions or data structures may be stored in the barometric pressure sensor 64 and the instructions cause the barometric pressure sensor 64 to measure barometric pressure level and compare the resulting altitude of the vehicle 12 and the external device 14. In some embodiments, a processor, previously described in FIG. 1, not only is capable of comparing the acceleration data collected by the accelerometer 28 with a set of pre-determined criteria and distinguishing the acceleration data associated with a motion or vibration of the external device 14, but the processor is also capable of comparing the altitude of the vehicle 12 and the external device 14.

Figure 4:
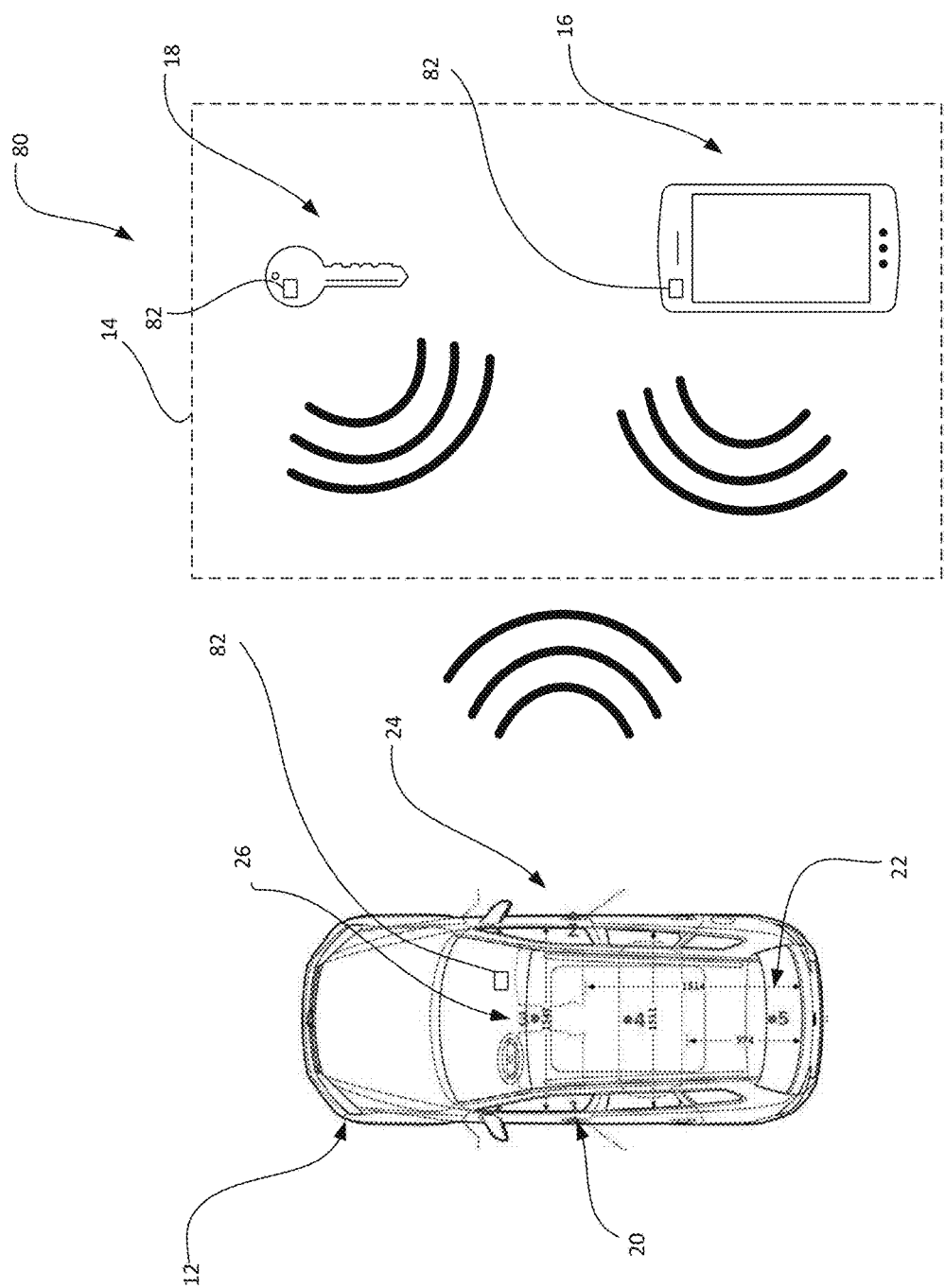
FIG. 4 is a block diagram of a system according to yet another described embodiment of the disclosure.

FIG. 4 illustrates another system 80 in accordance with a disclosure. The system 80 is identical to the system 10 illustrated in FIG. 1, except that the system 80 includes a location receiver 82 to determine a current location of the system. In one embodiment, the location receiver 82 is a global positioning system (GPS) configured to determine current coordinate, such as latitude and longitude, of the system. In another embodiment, the location receiver 82 may determine altitude of the system 80 other than the latitude and longitude. Each of the external device 14 and the vehicle 12 includes a location receiver 82. The location receiver 82 of the external device 14 transmits current location details of the external device 14 to the vehicle 12 via suitable communication protocol. The location receiver 82 of the vehicle 12 receives the current location details of the external device 14 and compares the received current location details of the external device 14 with the current location details of the vehicle 12. If both location details of the vehicle 12 and the external device 14 do not match, a bi-directional communication between the vehicle 12 and the external device 14 is disabled and the authentication process is terminated. In some embodiments, an optional comparator may be provided to compare the current location details of both the vehicle 12 and the external device 14. The bi-directional communication is disabled between the vehicle 12 and the external device 14 and the authentication process is terminated if the current location details of the vehicle 12 and the external device 14 do not match with each other. In one embodiment, the comparator may be integrated into the location receiver 82. In other embodiment, the comparator may be coupled to the location receiver 82.

FIG. 5 illustrates another system 100 in accordance with a disclosure. The system 100 is identical to the system 10 illustrated in FIG. 1, except that the system 100 is configured to measure an intensity of a magnetic field generated by the vehicle 12. As depicted, the vehicle 12 comprises at least one electromagnet E located at the same location as the transceivers 20, 22, 24, 26. In some embodiments, the electromagnet E may be positioned within the transceivers 20, 22, 24, 26. In another embodiment, the electromagnet E may be positioned adjacent to the transceivers 20, 22, 24, 26. Three electromagnets E are depicted, however, any number of electromagnets may be recommended without departing from the scope of the disclosure. External devices 14 such as a smart key 18, a thin client 28, or any suitable devices include at least a sensor 92 such as a magnetometer. When packages from a relay attacker replicating the external device 14 are received by the vehicle 12, the vehicle 12 generates a magnetic field including a change of intensity according to a randomly generated secret key. Any one of the external devices 14 measure the intensity of the magnetic field generated by the vehicle 12 using the magnetometer 92. The magnetometer 92 encrypts the measured magnetic field with a secret magnetic key and transmits the measured magnetic field with the encrypted secret magnetic key back to the vehicle 12. This process confirms the authentic presence of the external device 14 in the proximity of the vehicle 12. If the magnetic fingerprint is neither identifiable nor measurable by at least one of the external devices 14, the external devices 14 receives the package comprises the magnetic fingerprint and determines the received package is not transmitted by the vehicle 12 but rather from another unauthorized device such as the attacker. The external device 14 continues to detect any ongoing attacks and stops communication with the vehicle 12.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context of particular embodiments. Functionalities may be separated or combined in blocks differently in various embodiments of the disclosure or described with different terminology. These and other variations, modifications, additions, and improvements may fall within the scope of the disclosure as defined in the claims that follow.

What is claimed is:

1. A Bluetooth Low Energy (BLE) passive vehicle access control system comprising:
 a vehicle comprising:
  a first radio transceiver; and
  an electromagnet configured to generate an electromagnetic field with a varying intensity level based on a randomly generated key, the electromagnet being separate from the first radio transceiver; and
 an external device comprising:
  a second radio transceiver configured to transmit and receive encrypted data with the first radio transceiver in the vehicle;
  a magnetometer, the magnetometer being separate from the second radio transceiver; and
  a processor coupled to the first radio transceiver and the magnetometer, the processor being configured to:
   generate a fingerprint of an electromagnetic field in a region proximate to the external device based on measurements made using the magnetometer;
   transmit the fingerprint to the first radio transceiver in a first encrypted packet using a secret magnetic key to encrypt the fingerprint;
   identify a second encrypted packet received with the second radio transceiver is transmitted from the first radio transceiver in the vehicle only in response to the second encrypted packet including the fingerprint; and
   disable communication of the second radio transceiver in response to the second encrypted packet not including the fingerprint.

2. The BLE passive vehicle access control system of claim 1, the processor being further configured to:
 transmit the first encrypted packet including the fingerprint corresponding to measurements of changes in the electromagnetic field intensity using the second radio transceiver, the first encrypted packet being encrypted using the secret magnetic key.

3. The BLE passive vehicle access control system of claim 1 wherein the external device is at least one of a key/card device and a client device.

4. The BLE passive vehicle access control system of claim 3 wherein the key/card device is a key fob, key card, an access key, an access card, a smart card, and a smart key.

5. The BLE passive vehicle access control system of claim 3 wherein the client device is a smart phone, a personal digital assistant (PDA), a tablet, a laptop, a portable personal computer, a phablet, a wearable device, a thin device, a thick device, an entertainment device, and an infotainment device.

6. An external device used in an access control system for a vehicle comprising:
- a radio transceiver configured to transmit and receive encrypted data;
- a magnetometer, the magnetometer being separate from the radio transceiver; and
- a processor coupled to the radio transceiver and the magnetometer, the processor being configured to:
  - generate a fingerprint of an electromagnetic field in a region proximate to the external device based on measurements made using the magnetometer;
  - transmit the fingerprint to the another radio transceiver in the vehicle in a first encrypted packet using a secret magnetic key to encrypt the fingerprint;
  - identify that a second encrypted packet received with the radio transceiver is transmitted from the other radio transceiver in the vehicle only in response to the second encrypted packet including the fingerprint; and
  - disable communication of the radio transceiver in response to the second encrypted packet not including the fingerprint.

7. The external device of claim 6, the processor being further configured to:
- transmit the first encrypted packet including the fingerprint corresponding to measurements of changes in the electromagnetic field intensity using the radio transceiver, the first encrypted packet being encrypted using the secret magnetic key.

8. A method for operating an external device in an access control system for a vehicle comprising:
- generating, with a processor, a fingerprint of an electromagnetic field in a region proximate to the external device based on measurements made using a magnetometer in the external device;
- transmitting, with the processor and a radio transceiver in the external device, the fingerprint to the another radio transceiver in the vehicle in a first encrypted packet using a secret magnetic key to encrypt the fingerprint;
- identifying, with the processor, that a second encrypted packet received with the radio transceiver is transmitted from the other radio transceiver in the vehicle only in response to the second encrypted packet including the fingerprint; and
- disabling, with the processor, communication of the radio transceiver in response to the second encrypted packet not including the fingerprint.

9. The method of claim 8 further comprising:
- transmitting, with the processor and the radio transceiver, the first encrypted packet including the fingerprint corresponding to measurements of changes in the electromagnetic field intensity, the first encrypted packet being encrypted using the secret magnetic key.

10. The external device of claim 6 wherein the external device is at least one of a key/card device and a client device.

11. The external device of claim 10 wherein the key/card device is a key fob, key card, an access key, an access card, a smart card, and a smart key.

12. The external device of claim 11 wherein the client device is a smart phone, a personal digital assistant (PDA), a tablet, a laptop, a portable personal computer, a phablet, a wearable device, a thin device, a thick device, an entertainment device, and an infotainment device.

* * * * *